(12) United States Patent
Kwon et al.

(10) Patent No.: US 12,416,732 B2
(45) Date of Patent: Sep. 16, 2025

(54) METHOD AND ROBOT FOR SETTING AUTOMATIC ARRIVAL LOCATION ON MAP AND OPTIMIZING ROUTE BASED ON DATA

(71) Applicants: Polaris3D Co., Ltd., Pohang-si (KR); Electronics and Telecommunications Research Institute, Daejeon (KR)

(72) Inventors: WooKyong Kwon, Pohang-si (KR); HakJun Lee, Pohang-si (KR); Myeong Geun Park, Pohang-si (KR); Su Yeong Park, Pohang-si (KR)

(73) Assignees: Polaris3D Co., Ltd., Pohang-si (KR); Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/955,876

(22) Filed: Nov. 21, 2024

(65) Prior Publication Data

US 2025/0180749 A1    Jun. 5, 2025

(30) Foreign Application Priority Data

Dec. 1, 2023    (KR) .......................... 10-2023-0172435

(51) Int. Cl.
*G01S 17/931* (2020.01)
*G01S 17/87* (2020.01)
*G01S 17/89* (2020.01)

(52) U.S. Cl.
CPC ............ *G01S 17/931* (2020.01); *G01S 17/87* (2013.01); *G01S 17/89* (2013.01)

(58) Field of Classification Search
CPC .......... G01S 17/931; G01S 17/87; G01S 17/89
See application file for complete search history.

(56) References Cited

U.S. PATENT DOCUMENTS

| | | | |
|---|---|---|---|
| 12,298,110 B2* | 5/2025 | Ebrahimi Afrouzi | ....................... F41H 13/0087 |
| 2022/0066456 A1* | 3/2022 | Ebrahimi Afrouzi | ....................... G06F 3/04883 |
| 2024/0142994 A1* | 5/2024 | Ebrahimi Afrouzi | .. G06V 20/58 |
| 2024/0324838 A1* | 10/2024 | Ebrahimi Afrouzi | ....................... A47L 9/2857 |

FOREIGN PATENT DOCUMENTS

| | | |
|---|---|---|
| KR | 10-2020-0036678 A | 4/2020 |
| KR | 10-2020-0137943 A | 12/2020 |
| KR | 10-2306564 B1 | 9/2021 |

* cited by examiner

*Primary Examiner* — Peter D Nolan
*Assistant Examiner* — Demetra R Smith-Stewart
(74) *Attorney, Agent, or Firm* — Revolution IP, PLLC (57) ABSTRACT

A method for automatic arrival location on a map and data-based route optimization, includes: generating, by one or more processors of a robot, a 2D LiDAR map using LiDAR sensors and cameras implemented on the robot, wherein the 2D LiDAR map includes information related to objects comprising a table or a chair; setting, by the one or more processors, an arrival location of the robot from the 2D LiDAR map.

6 Claims, 5 Drawing Sheets

METHOD AND ROBOT FOR SETTING AUTOMATIC ARRIVAL LOCATION ON MAP AND OPTIMIZING ROUTE BASED ON DATA

CROSS-REFERENCE TO RELATED APPLICATIONS

This application claims the benefit of priority under 35 U.S.C. § 119(a) to Korean Patent Application No. 10-2023-0172435, filed on Dec. 1, 2023, the entire contents of which are incorporated herein by reference. This application also claims priority to any and all other applications to which it is entitled under the Paris Convention for the Protection of Industrial Property.

BACKGROUND

1. Field

The present disclosure relates to a method and a robot for automatically setting an arrival location on a map and optimizing a route based on data, and more particularly, to a method and system for automatically setting an arrival location of a robot and optimizing its route.

2. Description of Related Art

A serving robot is a robot that can autonomously deliver food and beverages. In order to operate a serving robot, it is necessary to manually generate a 2D map, mark locations for the robot to deliver food and beverages on the generated 2D map, and generate a route for the serving robot. This requires significant time and effort, and may necessitate specialized training. Therefore, to reduce time and effort, there is a need for a simple way for users to utilize serving robots in new spaces without the need for specialized operation.

SUMMARY

The technical objective of the present disclosure is to provide a method and a robot that can automatically set an arrival location on a map and optimize a route based on data.

A method for automatic arrival location on a map and data-driven route optimization, according to an embodiment of the present disclosure, comprises generating a 2D LiDAR map using LiDAR sensors and a camera implemented on a robot, and setting an arrival location of the robot from the 2D LiDAR map.

The information comprises a table or a chair.

The step of generating the 2D LiDAR map using LiDAR sensors and a camera implemented on the robot comprises recognizing the information using images captured by the camera, generating a floor plan of a traversable space using the LiDAR sensors, and overlaying the recognized information onto the floor plan.

The step of overlaying the recognized information onto the floor plan comprises determining a size of an object based on the recognized information and overlaying the determined size of the object onto the floor plan.

The step of setting an arrival location of the robot comprises displaying two imaginary lines on the 2D LiDAR map, extending in an x-axis direction and a y-axis direction relative to a center of the table; determining whether obstacles are present on each of the two imaginary lines; and, when an obstacle is detected on either of the two imaginary lines, performing a moving operation to move the imaginary line determined to have the obstacle, performing a determining operation to check for obstacles on the moved imaginary line and the remaining imaginary line, repeatedly performing the moving operation and the determining operation until both the moved imaginary line and the remaining imaginary line are free of obstacles, and setting the coordinates of the overlapping point of the moved imaginary lines as the arrival location of the robot.

A robot according to an embodiment of the present disclosure comprises a camera, a LiDAR sensor, one or more processors configured to execute instructions for automatic arrival location on a map and data-driven route optimization, and a memory storing the instructions.

The instructions, when executed by the one or more processors, cause the robot to generate a 2D LiDAR map including information using the LiDAR sensor and the camera, and to set an arrival location of the robot from the 2D LiDAR map.

The information may comprise a table or a chair.

The instructions for generating the 2D LiDAR map cause the robot to recognize the information using images captured by the camera, generate a floor plan of the traversable space using the LiDAR sensor, and overlay the recognized information onto the floor plan.

The instructions for overlaying the recognized information onto the floor plan comprise determining a size of an object based on the recognized information and overlaying the determined size of the object onto the floor plan.

The instructions for setting an arrival location of the robot comprise displaying two imaginary lines in an x-axis direction and a y-axis direction relative to a center of the table on the 2D LiDAR map; determining whether there are obstacles along each of the two imaginary lines; performing a moving operation, when an obstacle is detected on either of the two imaginary lines, to move the imaginary line determined to have the obstacle; performing a determining operation to check for obstacles on the moved imaginary line and the remaining imaginary line; repeatedly performing the moving operation and the determining operation until both the moved imaginary line and the remaining imaginary line are free of obstacles; and setting the coordinates of the overlapping point of the moved imaginary lines as the arrival location of the robot.

BRIEF DESCRIPTION OF THE DRAWINGS

In order to more fully understand the drawings cited in the detailed description of the present disclosure, a detailed description of each drawing is provided.

DETAILED DESCRIPTION

Certain structural or functional descriptions of embodiments in accordance with the concepts of the present invention disclosed herein are exemplified for the purpose of illustrating embodiments in accordance with the concepts of the present invention only, and embodiments in accordance with the concepts of the present invention may be implemented in various forms and are not limited to the embodiments described herein.

Embodiments in accordance with the concepts of the present invention can be implemented with various modifications and can take many forms, so embodiments are illustrated in the drawings and described in detail herein. However, this is not intended to limit embodiments according to the concepts of the present invention to any particular disclosed forms, and includes all modifications, equivalents, or substitutions that are within the scope of the ideas and techniques of the present invention.

Terms such as first, second, and the like may be used to describe various components, but the components are not to be limited by the terms. These terms are used solely for the purpose of distinguishing one component from another, for example, a first component may be named a second component, and similarly a second component may be named a first component, without departing from the scope of the rights in accordance with the concepts of the present invention.

When a component is referred to as being "connected" or "coupled" to another component, it is to be understood that it may be directly connected or coupled to the other component, but that there may be other components in between. On the other hand, when a component is the to be "directly connected" or "directly connected" to another component, it should be understood that there are no other components in between. Other expressions describing relationships between components, such as "between" and "directly between" or "adjacent to" and "directly adjacent to" should be interpreted similarly.

The terminology used herein is intended to describe particular embodiments only and is not intended to limit the invention. Expressions in the singular include the plural unless the context clearly indicates otherwise. In this specification, the terms "includes" or "has" and the like are intended to designate the presence of a described feature, number, step, action, component, part, or combination thereof, and are not to be understood as precluding the possibility of the presence or addition of one or more other features, numbers, steps, actions, components, parts, or combinations thereof.

Unless otherwise defined, all terms used herein, including technical or scientific terms, are intended to have the same meaning as commonly understood by one of ordinary skill in the technical field to which the present invention belongs. Such terms, as defined in commonly used dictionaries, are to be construed to have a meaning consistent with the meaning they have in the context of the relevant art and are not to be construed in an idealized or unduly formal sense unless expressly defined herein.

Hereinafter, the present disclosure will be described in detail by describing preferred embodiments of the present disclosure with reference to the accompanying drawings.

Figure 1:
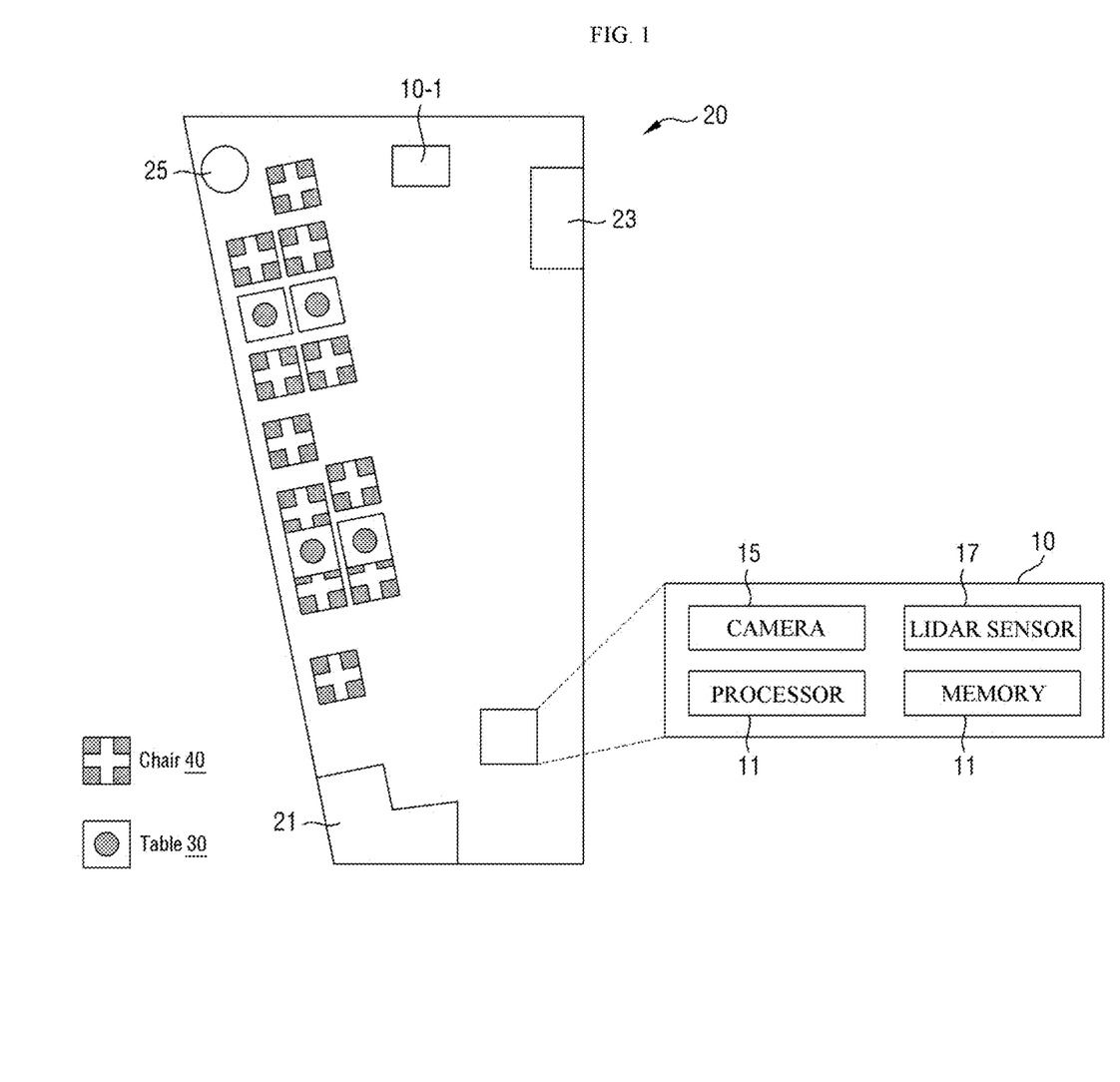
FIG. 1 illustrates a block diagram of a robot performing an automatic arrival location on a map and a data-based route optimization method, according to an embodiment of the present disclosure.

FIG. 1 is a block diagram of a robot performing a method of automatic arrival location on a map and data-based route optimization according to an embodiment of the present disclosure.

Referring to FIG. 1, the robot 10 may be a serving robot for serving food and beverages in a restaurant, or eatery. In accordance with embodiments, the robot 10 may be referred to as a delivery robot.

The robot 10 includes a processor 11 for storing instructions for automatic arrival location on a map and data-based route optimization, a memory 13 for storing the instructions, a camera 15, and a lidar sensor 17. As described herein, it may be understood that the behavior of the robot 10 is performed by one or more processors 11.

The instructions are implemented to utilize the lidar sensor 17 and the camera 15 to generate a 2D lidar map including information, and for setting an optimized arrival location of the robot 10 using the 2D lidar map. The arrival location of the robot 10 refers to a final arrival location, or an intermediate arrival location, to which the robot 10 should go.

Another robot 10-1 according to an embodiment may utilize a lidar sensor (not shown) and a camera (not shown) to generate a 2D lidar map.

The robot 10 and the other robot 10-1 may communicate with each other.

The robot 10 and the other robot 10-1 may generate a 2D lidar map at a certain time, transmit the generated 2D lidar map to each other via communication, and update the 2D lidar map.

The robot 10 receives a 2D lidar map generated at different times from the other robot 10-1 at a certain time, and updates the 2D lidar map. The robot 10 compares the generation time of the 2D lidar map generated by the robot 10 with the generation time of the 2D lidar map received from the other robot 10-1 and updates the 2D lidar map to the most recently generated 2D lidar map. The certain time means a time period of more than 30 minutes and less than 2 hours.

The robot 10 may compare the generation time of the 2D lidar map generated by the robot 10 with the generation time of the 2D lidar map received from the other robot 10-1 to determine whether the person sitting in the chair 40 is waiting for food or beverage at the table 30, whether the person is eating at the table 30, and whether the person has finished eating at the table 30.

When the 2D lidar map generated at the first time is recognized as not having a person in the chair 40 based on information recognized using the camera, and the 2D lidar map generated at the second time is recognized as having a person in the chair 40 based on information generated using the camera, the one or more processors 11 may determine that the person waited for food or beverage at the table 30 in the 2D lidar map generated at the second time.

When the 2D lidar map generated at the first time is recognized as having a person in the chair 40 based on information recognized using the camera, and the 2D lidar map generated at the second time is recognized as not having a person in the chair 40 based on information recognized using the camera, the one or more processors 11 may determine that the person finished eating at the table 30 in the 2D lidar map generated at the second time.

When the 2D lidar map generated at the first time is recognized as having a person in the chair 40 based on information recognized using the camera, and the 2D lidar map generated at the second time is recognized as having a person in the chair 40 based on information recognized using the camera, the one or more processors 11 may determine that the person is eating at the table 30 in the 2D lidar map generated at the second time. The first time is a time prior to the second time.

The behavior of the robot 10 may be divided into serving food and beverages to the table 30 and collecting empty plates from the table 30. The behavior of the robot 10 may be set by a user controlling the robot 10, or may be set based on an arbitrary time.

For example, the random time may be 30 minutes, such that the operation of serving food and beverages to the table 30 and the operation of collecting empty dishes from the table 30 may be repeatedly performed every 30 minutes.

A user controlling the robot 10 may set the behavior of the robot 10 by manipulating an interface implemented on the robot 10, or the behavior of the robot 10 may be set by utilizing an electronic device, such as a smartphone, that is in wireless communication with the robot 10.

When the action of the robot 10 is to serve food and beverages to the tables 30, and it is determined from the 2D lidar map generated at the second time that people have waited for food and beverages at the tables 30, the one or more processors 11 set as preliminary destinations for the tables where it is determined that people have waited for food and beverages in the 2D lidar map generated at the second time.

When the action of the robot 10 is to serve food and beverages to the table 30, and it is determined from the 2D lidar map generated at the second time that a person waited for food and beverages at the table 30, the one or more processors 11 set obstacles. The obstacles may include tables determined to be occupied by humans in the 2D lidar map generated at the second time, and tables determined to be occupied by humans at the table 30 when the humans have finished eating.

When the action of the robot 10 is to collect empty plates at the tables 30, and it is determined from the 2D lidar map generated at the second time that the humans at the tables 30 have finished eating, the one or more processors 11 set preliminary destinations. The preliminary destinations may include the tables at which the human has been determined to have finished eating in the 2D lidar When the behavior of the robot 10 is to collect empty plates at the table 30, and it is determined that a person has finished eating at the table 30 in the 2D lidar map generated at the second time, the one or more processors 11 may set as obstacles the tables that were determined to be waiting for food and beverages and the tables that were determined to be occupied by a person in the 2D lidar map generated at the second time. map generated at the second time.

In other words, different actions of the robot 10 result in different preliminary destinations being set. The robot 10 may set any one of the set preliminary destinations as the final destination. The setting of the final destination may be arbitrary among the preliminary destinations.

The set preliminary destinations may be displayed on an interface of the robot 10. A user of the robot 10 may select any one of the set preliminary destinations as the final destination. By displaying the preliminary destinations on the interface of the robot 10, the user can quickly select a desired destination as the final destination.

The robot 10 moves through the interior of the restaurant 20, photographs the interior of the restaurant 20 using the camera 15, and scans the interior of the restaurant 20 using the lidar sensor 17.

Figure 2:
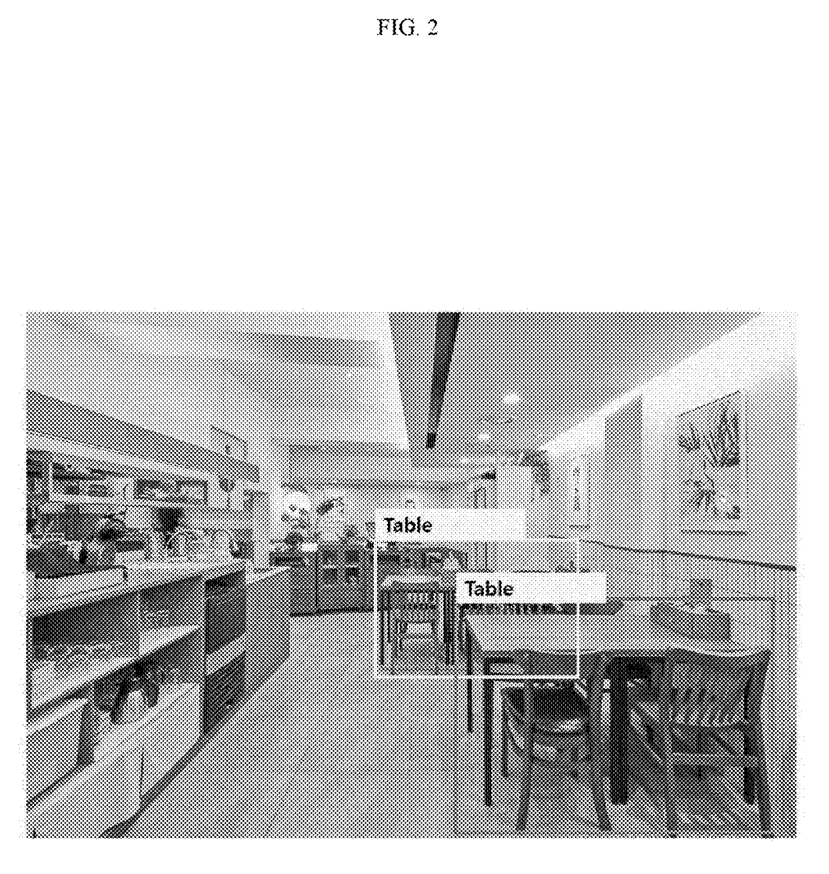
FIG. 2 illustrates an image taken by a camera of the robot shown in FIG. 1.

FIG. 2 illustrates an image taken by the camera of the robot shown in FIG. 1.

Referring to FIGS. 1 and 2, the processor 11 recognizes information using the image taken by the camera 15. The information may refer to something recognized using the image taken by the camera 15. For example, the information may be a table 30, or a chair 40. Depending on the embodiment, the information may be a person, or an obstacle 21, 23, or 25.

To recognize the information, the one or more processors 11 may utilize a neural network algorithm, such as a convolutional neural network (CNN). The one or more processors 11 may apply the image captured by the camera 15 to the neural network algorithm to recognize the information.

Figure 3:
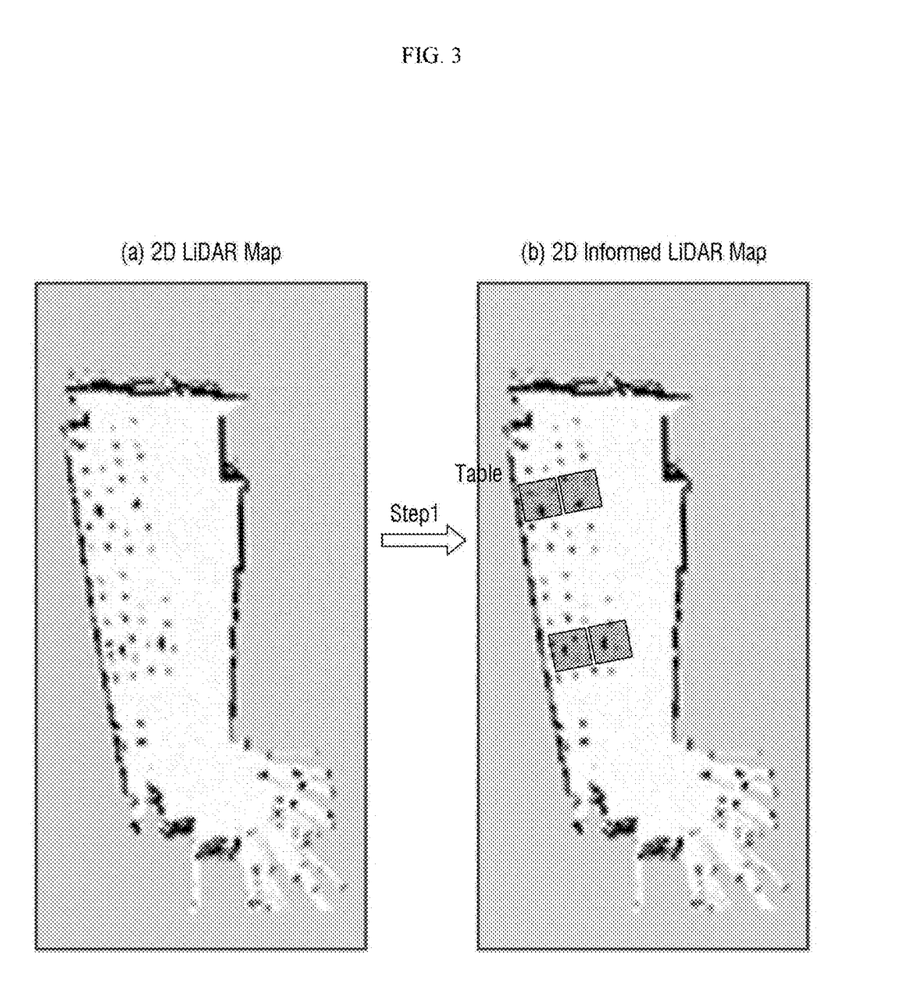
FIG. 3 illustrates a floor plan with information overlapping with a floor plan generated by a lidar sensor of the robot shown in FIG. 1.

FIG. 3 illustrates a floor plan with information overlapping with the floor plan generated by the lidar sensor of the robot shown in FIG. 1. (A) of FIG. 3 illustrates a floor plan generated by the lidar sensor of the robot, and (B) of FIG. 3 illustrates a floor plan with overlapping information.

Referring to (a) of FIG. 3, the robot 10 may move through the interior of the restaurant 20, and the robot 10 may scan the interior of the restaurant 20 using the lidar sensor 17 to generate a floor map of the interior of the restaurant 20.

Referring to (b) of FIG. 3, the processor 11 overlays the recognized information on the floor plan.

Specifically, the processor 11 determines a size of an object to be overlaid on the floor plan based on the recognized information.

When the recognized information is a single table, the processor 11 overlays on the floor plan a size of the table corresponding to the size of the single table on the floor plan. Depending on the embodiment, the floor plan may additionally display a name of the recognized information (e.g., "table").

The one or more processors 11 may set the size of the corresponding table in advance.

The robot 10 may further include a GPS sensor (not shown). Based on the GPS sensor, the processor 11 may determine a position of an image taken by the camera 15 and a corresponding position of the image on the floor plan.

When the recognized information is two tables, the processor 11 may use the other recognized information (e.g., obstacles 21, 23, or 25, or an already overlaid table 30) to determine relative position relationship information between the two tables.

For example, the one or more processors 11 may determine the relative positional relationship information to determine that one table is to the left of the obstacle 21, 23, or 25 and the other table is to the right of the obstacle 21, 23, or 25.

Based on the relative positional relationship information, the one or more processors 11 overlay a size of each of the two tables and a corresponding size of the table on the flatness.

Figure 4:
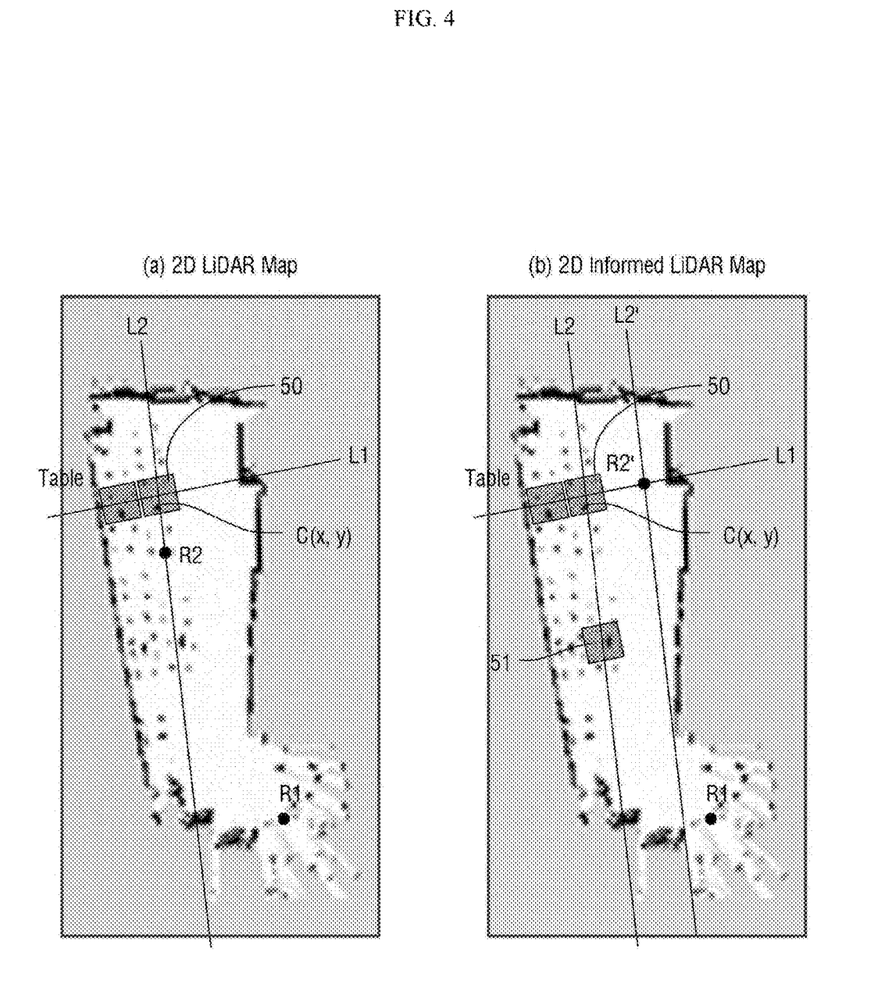
FIG. 4 illustrates a floor plan with information overlapped to illustrate a method for setting an arrival location of a robot according to an embodiment of the present disclosure.

FIG. 4 illustrates a plan view with information overlaid to illustrate a method for setting an arrival location of a robot according to an embodiment of the present disclosure.

(a) of FIG. 4 illustrates a 2D lidar map that includes information that each of the imaginary lines L1, L2 is unobstructed, and (b) of FIG. 4 illustrates a 2D lidar map that includes information that either of the imaginary lines L1, L2 is obstructed.

Referring to FIGS. 1 to 4(a), the processor 11 sets an arrival location of the robot 10 from the 2D lidar map.

The one or more processors 11 mark two imaginary lines L1, L2 in the x-axis direction and the y-axis direction relative to the center (C(x, y)) of the table 50 of the 2D lidar map including the information.

The table 50 is a destination for the robot 10, and may be set by the robot 10 itself, or may be set by a user controlling the robot 10. The user controlling the robot 10 may set the destination of the robot 10 by manipulating an interface implemented on the robot 10, or the destination of the robot 10 may be set by utilizing an electronic device, such as a smartphone, that is in wireless communication with the robot 10. The robot 10 may arbitrarily set a destination. The destination refers to an object, such as the table 50, and the arrival location refers to a reachable location of the robot 10 near the destination. The robot 10 can reach near the destination but cannot go to the destination. Since the destination is the table 50, when the robot 10 arrives at the table 50, the robot 10 and the table 50 will collide.

The processor 11 determines whether there are obstacles on each of the two imaginary lines L1 and L2 shown above. The determination of whether there is an obstacle determines whether each of the two imaginary lines L1, L2 shown above has an obstacle in the direction in which the current position R1 of the robot 10 is located (the downward direction with respect to the center (C(x, y)) of the table 50). The obstacle refers to an object, such as another table, a chair, a person, or an obstacle, that prevents the robot 10 from moving to the destination (e.g., the table 50).

When it is determined that each of the imaginary lines L1, L2 is free of obstacles, the processor 11 sets an arrival location R2 for the robot 10. The arrival location R2 refers to a point a certain distance away from the center C (x, y) of the table 50. The constant distance may be arbitrarily set by the processor 11. The path of the robot 10 is set to reach the arrival location R2.

The robot 10 is set at a first running speed to the arrival location R2, and is set at a second running speed from the arrival location R2 to near the table 50. Near the table 50 means within a short distance (e.g., 50 centimeters) from the table 50 where the customer can be served food and beverages by the robot 10. The first traveling speed is faster than the second traveling speed. By making the first traveling speed faster than the second traveling speed, it has the effect of providing food and beverages more stably. If the robot 10 runs from the arrival location R2 to the vicinity of the table 50 at the first running speed, a possibility of a collision between the robot 10 and the table 50 may exist.

Referring to (b) of FIG. 4, when it is determined that there is an obstacle 51 on any one of the two imaginary lines L1, L2 shown above, the processor 11 performs a move operation to move the imaginary line L2 where the obstacle 51 is determined to be. The moving operation means equilibrium movement by a certain distance.

The distance moved of the imaginary line L2 may include a distance moved by a point that is a constant distance away from the center C (x, y) of the table 50.\

The processor 11 performs a determining operation to determine whether there are obstacles between the moved imaginary line L2' and each of the remaining imaginary lines L1.

The processor 11 repeatedly performs the moving operation and the determining operation until there are no obstacles on each of the moved imaginary line L2' and the remaining imaginary line L1.

The processor 11 sets the coordinates R2' of the overlapping points of the moved imaginary lines L1, L2' as the arrival location R2' of the robot 10 by repeatedly performing the above moving operation and the above determining operation. The arrival location R2' of the robot 10 refers to a point at a certain distance from the center C (x, y) of the table 50.

Figure 5:
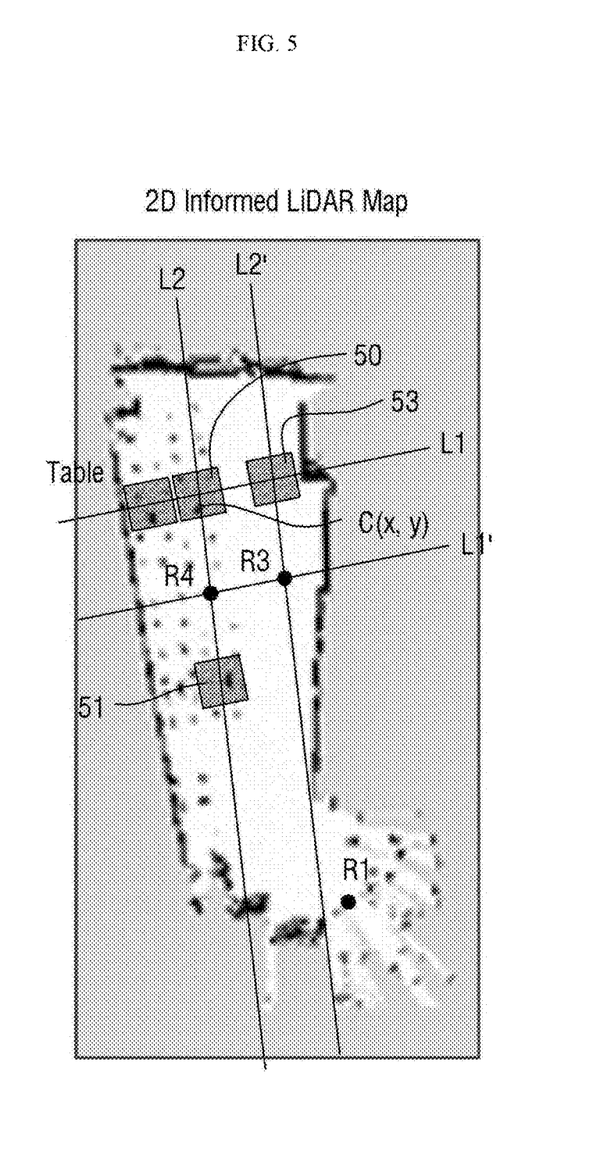
FIG. 5 illustrates another floor plan with overlapping information to illustrate a method of establishing an arrival location of a robot according to an embodiment of the present disclosure.

FIG. 5 illustrates another top view with overlapping information to illustrate a method for setting an arrival location of a robot according to an embodiment of the present disclosure.

Referring to FIGS. 1 and 5, when it is determined that there is an obstacle 51 on one of the two imaginary lines L1, L2 shown above, the processor 11 performs a moving operation to move the imaginary line L2 along which the obstacle 51 is determined to be located.

The processor 11 performs a determining operation to determine whether there is an obstacle on each of the moved imaginary line L2' and the remaining imaginary line L1.

The processor 11 repeatedly performs the moving operation and the determining operation until there are no obstacles on each of the moved imaginary line L2' and the remaining imaginary line L1.

Since it is determined that there are obstacles 53 on each of the moved imaginary line L2' and the remaining imaginary line L1, the processor 11 performs a move operation to move the imaginary line L1 determined to have obstacles 53.

The processor 11 repeatedly performs the above moving operation and the above determining operation to set the coordinates R3 of the overlapping points of the above moved imaginary lines L1', L2' as the first arrival location R3 of the robot 10.

The processor 11 determines that the first arrival location R3 is within a certain distance from the center (C(x, y)) of the table 50.

When the first arrival location R3 is not determined to be within a constant distance from the center (C(x, y)) of the table 50, the processor 11 sets the second arrival location R4 by moving along the imaginary line L1' by a constant position such that the arrival location is within a constant distance from the center (C(x, y)) of the table 50. The predetermined position may be arbitrarily set.

In other words, the robot 10 passes through the first arrival location R3 and the second arrival location R4. The path of the robot 10 is set.

In the prior art, the robot moves in real time, analyzes the image taken by the camera embodied in the robot to determine whether there is an obstacle, and avoids the obstacle so that the robot moves, but this becomes a burden on the processor in that it is necessary to analyze the image in real time.

In the present disclosure, by informing the arrival location of the robot 10 and setting a route, it is not necessary to analyze the image taken by the camera 15 in real time, which can reduce the burden on the processor 11.

A method for automatic arrival location setting and data-based route optimization on a map and a robot according to an embodiment of the present disclosure, wherein the robot generates a 2D lidar map including information using a lidar sensor and a camera embodied in the robot, setting an arrival location of the robot on the generated 2D lidar map, wherein the method has the effect of automatically setting an arrival location of the robot.

The disclosure has been described with reference to one embodiment shown in the drawings, which is exemplary only, and it will be understood by one having ordinary knowledge in the art that various modifications and other equivalent embodiments are possible therefrom. Accordingly, the true scope of technical protection of the disclosure should be determined by the technical ideas of the appended claims.

Explanation of the Symbol

10: Robot;
11: Processor;
13: Memory;
15: Camera;
17: lidar sensor.

The invention claimed is:

1. A method for automatic arrival location on a map and data-based route optimization, the method comprising:
   generating, by one or more processors of a robot configured to provide serving or delivery services, a 2D LiDAR map using at least one LiDAR sensor and at least one camera implemented on the robot, wherein the 2D LiDAR map includes information related to objects including a table or a chair;
   autonomously setting, by the one or more processors, an arrival location of the robot from the 2D LiDAR map;
   wherein autonomously setting the arrival location of the robot comprises:
   displaying, by the one or more processors, the two imaginary lines extending in an x-axis direction and a y-axis direction relative to a center of the table or the chair on the 2D LIDAR map;
   determining, by the one or more processors, whether obstacles are present on each of the two imaginary lines;
   when an obstacle is detected on any one of the two imaginary lines, performing, by the one or more processors, a moving operation to move the imaginary line determined to have the obstacle;
   performing, by the one or more processors, a determining operation to check for obstacles on both the moved imaginary line and the remaining imaginary line;
   repeating, by the one or more processors, the moving operation and the determining operation until both the moved imaginary line and the remaining imaginary line are free of obstacles; and
   setting, by the one or more processors, a coordinate of an overlapping point of the moved imaginary lines as the arrival location of the robot.

2. The method of claim 1, wherein generating a 2D LiDAR map comprises:
   recognizing, by one or more processors, information using images captured by the camera implemented on the robot;
   generating, by the one or more processors, a floor plan of a traversable space using the LiDAR sensor; and
   overlaying, by the one or more processors, the recognized information onto the generated floor plan.

3. The method of claim 2, wherein overlaying the recognized information onto the floor plan comprises:
   determining, by the one or more processors, a size of an object to be overlaid on the floor plan based on the recognized information; and
   overlaying, by the one or more processors, the determined size of the object onto the floor plan for automatic arrival location establishment and data-based route optimization.

4. A robot configured to provide serving or delivery services, comprising:
   a camera;
   a LiDAR sensor;
   one or more processors configured to execute instructions for automatically setting an arrival location on a map and optimizing a delivery route based on data; and
   a memory storing the instructions, wherein the instructions, when executed by the one or more processors, cause the robot to:
   generate a 2D LiDAR map including information using the LiDAR sensor and the camera;
   autonomously set the arrival location of the robot from the 2D LiDAR map, wherein the information comprises a table or a chair;
   display two imaginary lines in an x-axis direction and a y-axis direction relative to a center of the table or the chair on the 2D LiDAR map;
   determine whether there are obstacles along each of the two imaginary lines;
   perform a moving operation, when an obstacle is detected on either of the two imaginary lines, to move the line with the detected obstacle;
   perform a determining operation to check for obstacles on both the moved imaginary line and the remaining imaginary line; and
   repeatedly perform the movement and determining operations until both imaginary lines are free of obstacles and set a coordinate of the overlapping point of the imaginary lines as the arrival location.

5. The robot of claim 4, wherein the instructions further cause the robot to:
   recognize information using images captured by the camera;
   generate a floor plan of the traversable space using the LiDAR sensor; and
   overlay the recognized information onto the generated floor plan.

6. The robot of claim 5, wherein overlaying the recognized information onto the floor plan comprises:
   determining a size of an object to be overlaid based on the recognized information; and
   overlaying the determined size of the object onto the floor plan.

* * * * *